July 18, 1944.  L. S. WILCOXSON  2,354,175
APPARATUS FOR THE RECOVERY OF HEAT AND CHEMICALS FROM WASTE LIQUOR
Filed July 27, 1940   6 Sheets-Sheet 1
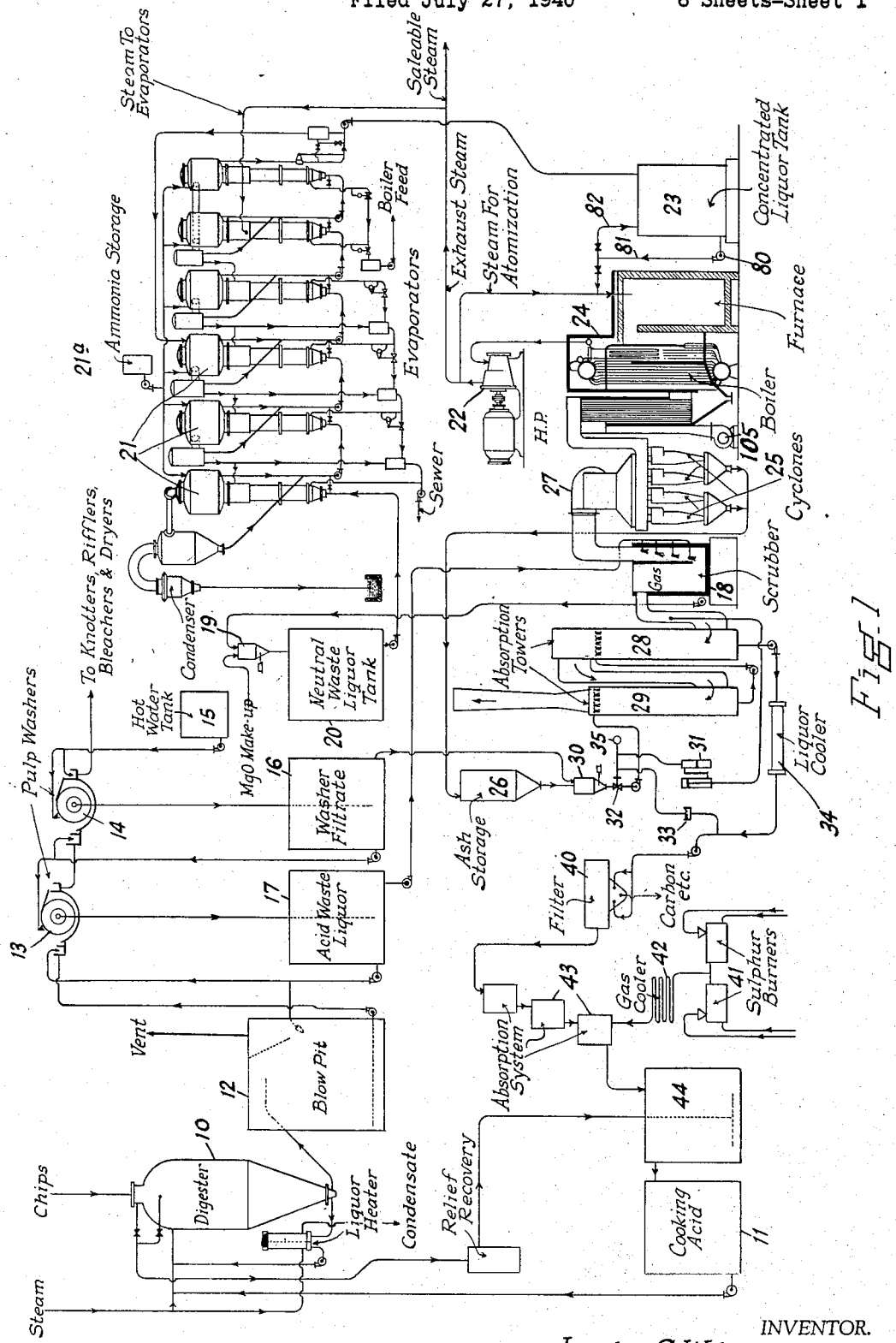
INVENTOR.
Leslie S. Wilcoxson
BY
Joseph P. Moran
ATTORNEY.

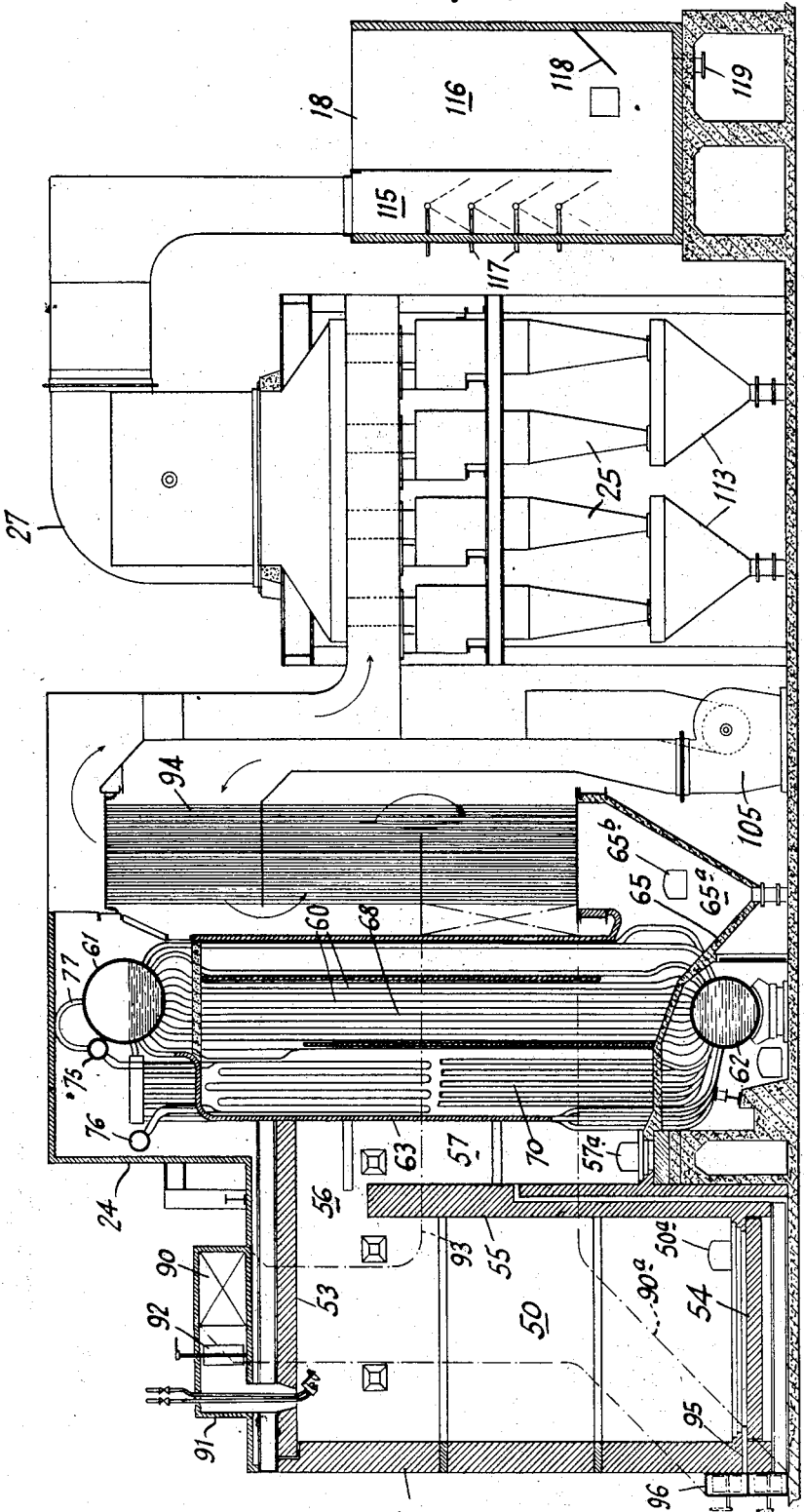

July 18, 1944.   L. S. WILCOXSON   2,354,175
APPARATUS FOR THE RECOVERY OF HEAT AND CHEMICALS FROM WASTE LIQUOR
Filed July 27, 1940   6 Sheets-Sheet 3
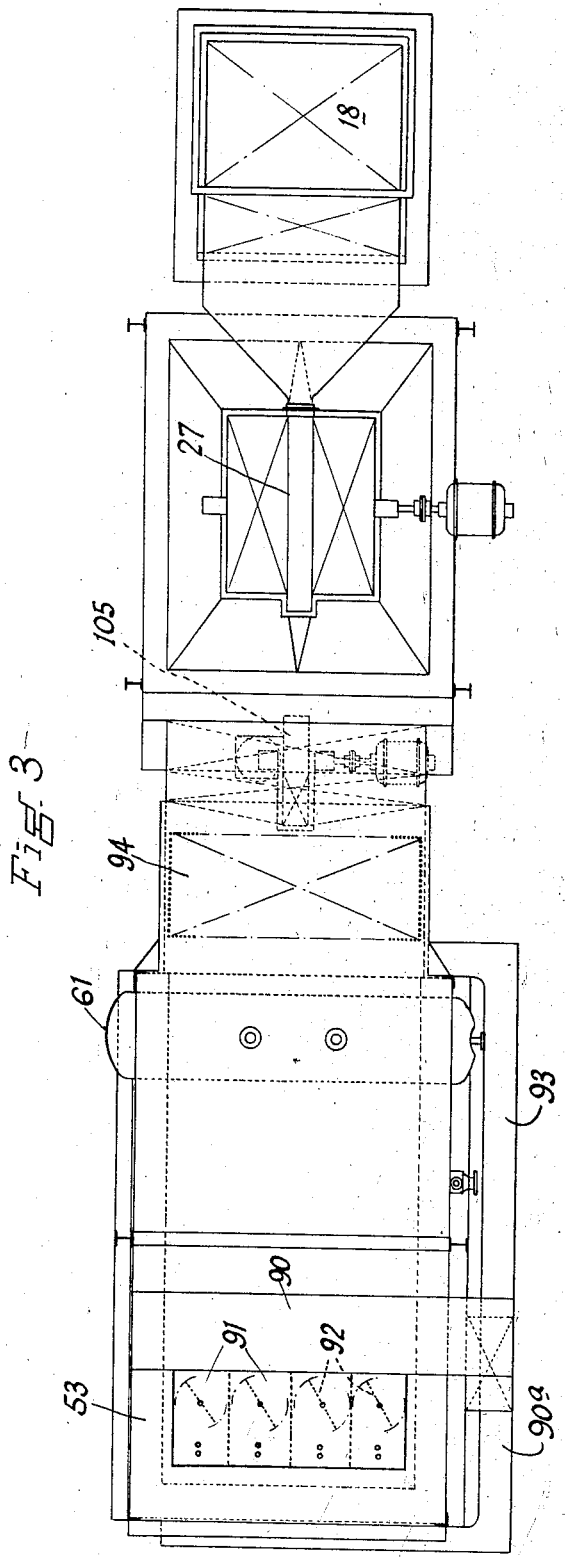
INVENTOR.
Leslie S. Wilcoxson
BY Joseph P. Moran
ATTORNEY.

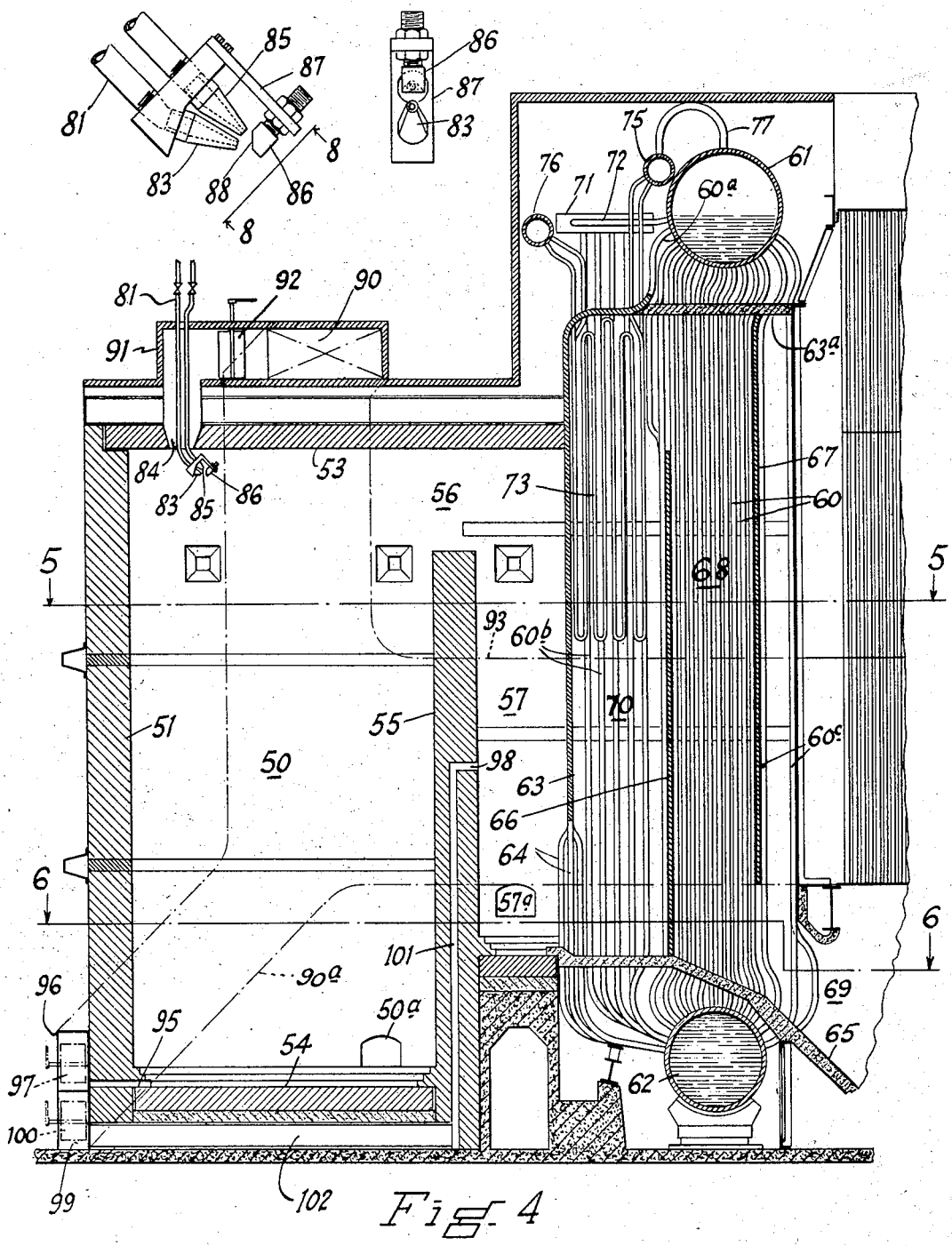

July 18, 1944. L. S. WILCOXSON 2,354,175
APPARATUS FOR THE RECOVERY OF HEAT AND CHEMICALS FROM WASTE LIQUOR
Filed July 27, 1940 6 Sheets-Sheet 5
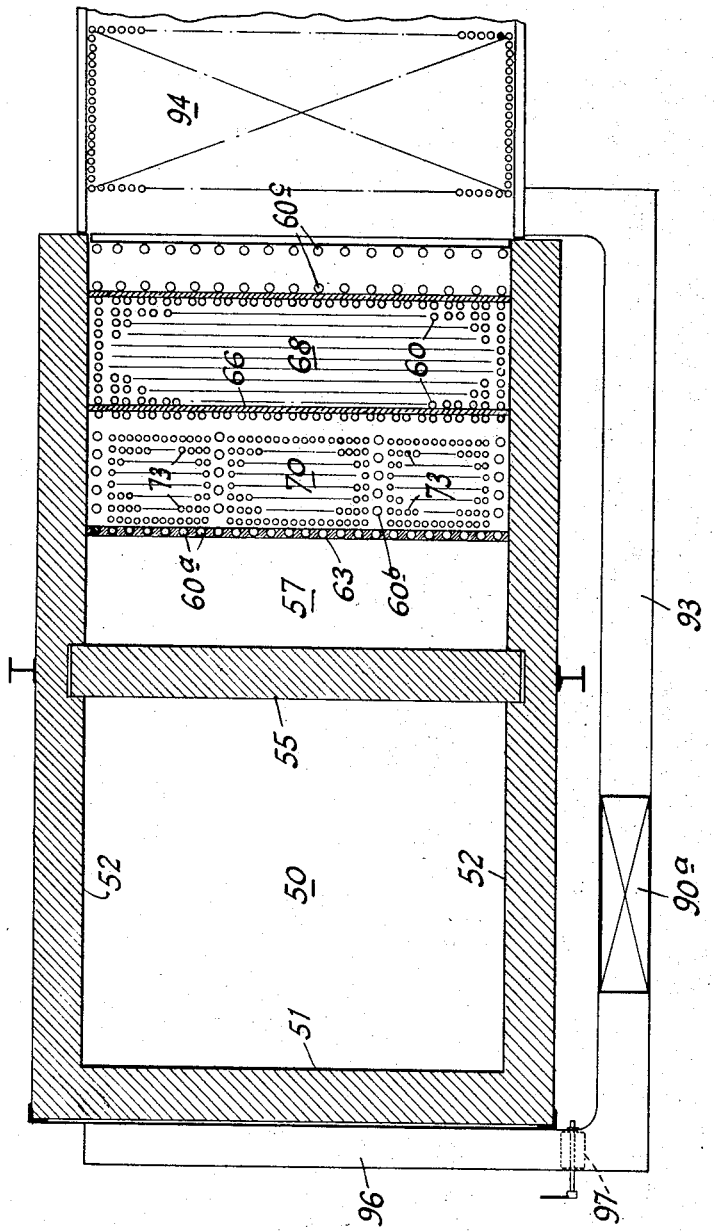
INVENTOR.
Leslie S. Wilcoxson
BY Joseph P. Moran
ATTORNEY.

July 18, 1944.   L. S. WILCOXSON   2,354,175
APPARATUS FOR THE RECOVERY OF HEAT AND CHEMICALS FROM WASTE LIQUOR
Filed July 27, 1940    6 Sheets-Sheet 6
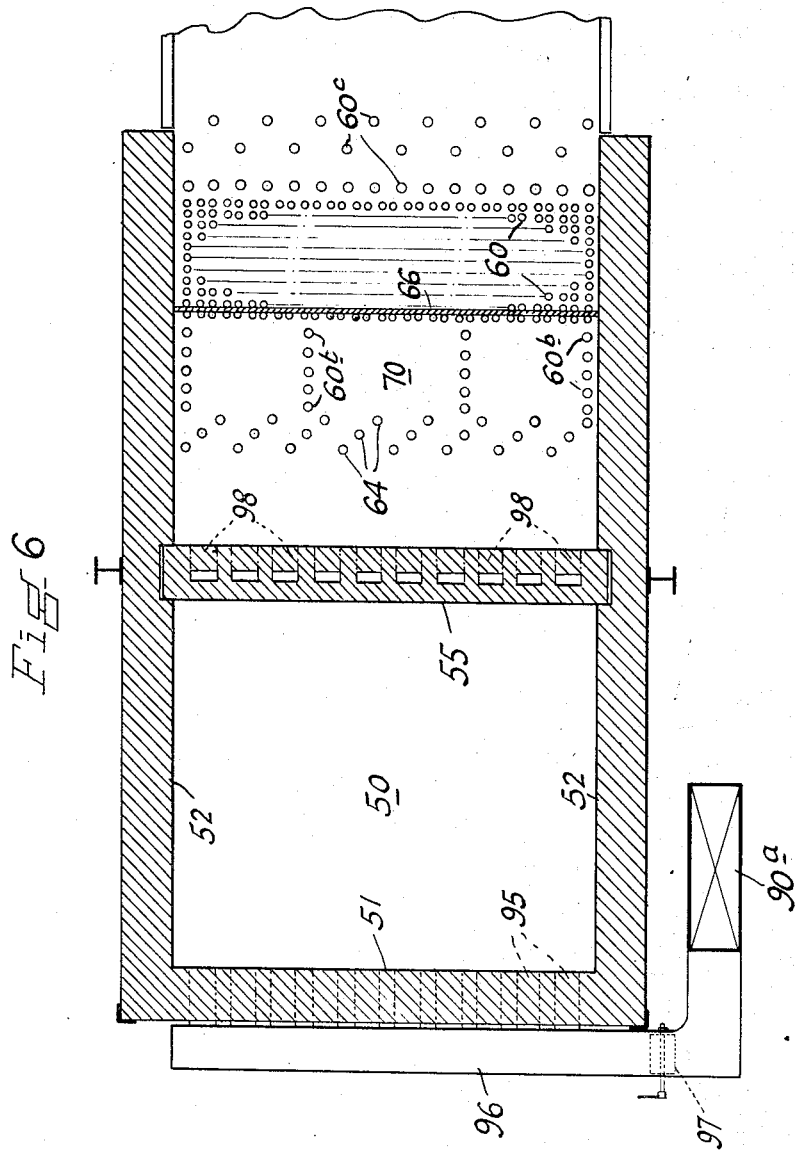
INVENTOR.
Leslie S. Wilcoxson
BY Joseph P. Moran
ATTORNEY.

Patented July 18, 1944

2,354,175

UNITED STATES PATENT OFFICE 2,354,175

APPARATUS FOR THE RECOVERY OF HEAT AND CHEMICALS FROM WASTE LIQUOR

Leslie S. Wilcoxson, Ridgewood, N. J., assignor to The Babcock & Wilcox Company, Newark, N. J., a corporation of New Jersey Application July 27, 1940, Serial No. 347,944

12 Claims. (Cl. 23—262)

The present invention relates in general to improvements in the manufacture of pulp from cellulosic fibrous material by the "acid" or "sulphite" process, and more particularly, to a process of the character described employing a relatively pure magnesium base sulphite cooking liquor.

The general object of my invention is the provision of an improved system of manufacturing pulp from cellulosic fibrous material using a relatively pure magnesium base sulphite cooking liquor. A further object is the provision of an improved self-supporting cyclic system of recovering chemicals and heat from, and completely disposing of, the residual pulp liquor in a process of the character described. A further and more specific object is the provision of an improved apparatus for incinerating the residual liquor and recovering magnesium and sulphur from the residual pulp liquor in a form permitting their economic reuse in the pulping process, and heat in economic quantities.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is a diagrammatic flow sheet of a cyclic sulphite pulp liquor recovery system embodying my invention;

Fig. 2 is an elevation, partly in section, of a portion of the recovery apparatus incorporated in Fig. 1;

Fig. 3 is a plan view, partly in section, of the apparatus shown in Fig. 2;

Fig. 4 is an enlarged sectional elevation of the recovery furnace and boiler shown in Fig. 2;

Figs. 5 and 6 are horizontal sections taken on the lines 5—5 and 6—6 of Fig. 4 respectively;

Fig. 7 is an enlarged view of spray nozzle arrangement shown in Figs. 2 and 3; and Fig. 8 is a view of the spray nozzle taken on the line 8—8 of Fig. 7.

The cyclic recovery system shown in Fig. 1 is of the general character disclosed in U. S. patents, Nos. 2,238,456 and 2,285,876 of George H. Tomlinson. In such cyclic systems a cooking liquor consisting of a relatively pure acid sulphite compound of magnesium, i. e. magnesium bisulphite, with an excess of sulphur dioxide, is supplied to a digester 10 from a cooking acid tank 11. The digester 10 is shown as being equipped for indirect heating, permitting the Baumé of the residual liquor following cooking to be maintained at a higher value than would be posisble if direct steaming were employed. A more economical evaporation of the liquor to the desired concentration for combustion is thus made possible.

When the cooking operation is completed the contents of the digester are discharged into a blow pit 12 from which gases are vented and the pulp and liquor pumped to suitable pulp washing equipment, such as the rotary vacuum filters 13 and 14 arranged in series.

Wash water from the hot water tank 15 is delivered to the pulp washer 14 as indicated and the filtrate discharged into the tank 16, from which a portion is delivered to the pulp washer 13 to serve as wash liquor therein. The filtrate from the second washer 14 is also employed to insure the correct consistency of the pulp going to that washer by returning a portion of the filtrate to the stock box of the washer. A further advantageous use of the filtrate is as a basis for the magnesia suspension employed in the absorption towers, even though this results in the circulation of a small amount of inert solids in solution in the total system, as the filtrate thus forms the basis of subsequent cooking liquor. The filtrate from the washer 13 is sent to the acid waste liquor tank 17 from which a portion is returned to the stock box of the washer 13, and another portion to the blow pit 12 to increase the fluidity of the pulp and thus facilitate its delivery to the pulp washers. Substantially all of the liquor and washer filtrate is thus maintained in the system, the only loss being that carried out by the pulp leaving the second washer 14.

The residual liquor in the tank 17 will have a solid content of approximately 10%. This liquor is utilized as the wash liquor in a gas scrubber or spray tower 18 which receives the heating gases generated in the chemical recovery furnace after most of the chemicals have been separated therefrom and prior to the absorption towers. The spraying of the liquor into intimate contact with the hot gases effects the liberation of any free sulphur dioxide in the liquor and upon its liberation is carried with the heating gases for recovery in the subsequent absorption towers. It also results in the recovery of most of the small amount of chemicals present in the gases coming to the scrubber, and the magnesia oxide so recovered will partly neutralize the acid liquor. Some evaporation of the weak acid liquor also results, thus reducing the amount of concentrating to be done in the evaporators and saving steam.

The partly concentrated residual liquor with its content of magnesium lignin sulphonate is then pumped from the scrubber and neutralized by the controlled addition of magnesium oxide to a neutralizing tank 19 and delivered to the neutral waste liquor tank 20. The magnesium oxide will normally be a portion of the ash recovered in the cyclones, but as indicated, may include fresh magnesia used as make-up to the system. When magnesium sulphate is used as make-up to the system, this is the preferable point of addition, as the inert sulphate will be reduced to highly reactive magnesium oxide on passing through the recovery furnace, and thus become immediately effective as active chemical. If the sulphate were added to the cyclic system subsequent to the furnace, it would be an inert burden in the first batch of cooking liquor of which it formed a part. The acid residual liquor is highly corrosive, having a pH of 2.5 to 3.0, and unless neutralization is effected the equipment handling the liquor must necessarily be made of relatively expensive corrosion-resisting alloy. The neutralizing magnesia dissolves readily, producing a slightly alkaline liquor having a pH normally in the range of 7.2 to 8.5. No precipitation of organic or inorganic material has been found to occur even at a pH of 8.5.

Further concentration of the neutralized residual liquor to a concentration of 50-60 percent solids (31°-40° Baumé) is economically desirable, and this is attained by passing the neutralized liquor from the tank 20 to a multiple effect evaporator system shown as a six-stage evaporator 21, in the first stages of which the liquor is heated by exhaust steam from a back pressure turbine 22. The condensate from the first evaporator heating effect is advantageously used as part of the boiler feed water supply, the condensate from subsequent effects being available where hot wash water is desirable. To avoid corrosion which tends to occur in the vapor heads of the evaporators due to the release of organic acids from the liquor being concentrated, provision is made for the addition of small amounts of ammonia thereto from the ammonia tank 21ᵃ to neutralize the acid constituents.

A representative analysis of the concentrated liquor leaving the evaporator is as follows:

| | | |
|---|---|---|
| Free moisture | per cent | 45.0 |
| Carbon | do | 25.04 |
| Hydrogen | do | 2.41 |
| Sulphur | do | 2.75 |
| Ash | do | 6.87 |
| Oxygen and nitrogen | do | 17.93 |
| B. t. u. per lb | | 4,160 | a storage tank 23 and supplied as required to the chemical recovery unit 24 and burned therein under self-sustaining combustion conditions to yield a dry ash consisting mainly of caustic magnesium oxide (MgO), and also more than enough steam to satisfy the requirements of the system. The construction and operation of the recovery unit is hereinafter set forth in detail.

The ash leaves the recovery unit in suspension in the furnace gases which are then passed through suitable ash separating apparatus, such as the cyclones 25 arranged in parallel, from which the separated ash is withdrawn and delivered to an ash storage tank 26. The operation of the cyclones is particularly effective as the chemical is normally present in the gases in particles of sufficient size to permit of their removal by such separating means. The conditions of the gases and chemicals when in the cyclones are such as to insure ease of operation and long life to that apparatus.

An induced draft fan 27 is located at the gas discharge end of the cyclones. This is an advantageous location for the fan as the solids in the gases have been reduced to a point suitable for good fan operation and the temperature of the gases is sufficiently above the dew point of the gases to definitely avoid any corrosive action on the fan.

Most of the remaining ash in the gases is removed during the passage of the gases through the scrubber 18, as has been described. On leaving the scrubber the gases are delivered to serially connected absorption towers 28 and 29 for the recovery of the sulphur content of the gases. In the sulphur absorption towers, the gases are subjected to contact with a slurry consisting mainly of magnesia in suspension formed by mixing ash from the tank 26 with the filtrate from the second pulp washer. The slurry is fed necessarily into the top of each absorption tower and passes downwardly over wooden slats in counter-current relation to the relatively low temperature ascending gas. During its passage through the towers the magnesia in suspension combines with the sulphur dioxide content of the gases and forms magnesium sulphite and bisulphite in solution. Any sulphur trioxide present in the towers will combine to form magnesium sulphate in the resulting liquor which reaction, while forming inert sulphate, retains the chemicals in the system for subsequent reduction and reuse. By the foregoing operations the gases passing from the upper end of the absorption tower 29 to the stack have had both their solid magnesium oxide and gaseous sulphur compounds efficiently removed.

In order to have and maintain the greatest recovery efficiency in the absorption towers, a balance is required between the amount of magnesium oxide in the slurry and the amount of sulphur dioxide in the gases. The accumulation of calcium impurities in the system is also controlled to cause the calcium sulphite formed to remain in suspension and the magnesium to go into solution as sulphite and bisulphite. The slurry fed to the towers is preferably a liquor of high alkalinity, i. e. a liquor having a pH value of about 9.5, but as an increasing amount of sulphur dioxide is combined, the pH value rapidly falls. As disclosed in said Tomlinson application Serial No. 221,304, the pH value of the liquor leaving the absorption tower 28 is preferably maintained within the pH range of 4.0-7.0, whereby any calcium sulphite formed from calcium impurities in the residual liquor will be relatively insoluble and remain in suspension and the magnesium sulphite formed will be highly soluble. As diagrammatically illustrated in Fig. 1, the slurry for the serially arranged absorption towers is formed by mixing the washer filtrate from the tank 16 with ash from the ash storage tank 26 in predetermined proportions in a mixing tank 30. The amount of slurry serially supplied to the absorption towers is automatically controlled in response to variations in the percentage of $SO_2$ in the gases passing to the absorption towers, by means of an automatic $SO_2$ analyzer 31 and a remote control valve 32. A supplementary control of the valve 32 can be used when necessary to compensate for variations in the amount of gases passing to the absorption towers. The alkaline liquor leaving the second absorption tower 28 is passed through a liquor cooler 34 in which its temperature is reduced to facilitate the subsequent absorption of $SO_2$ from the sulphur burners. The operation of the valve 32 in response to the $SO_2$ analyzer is checked by having a pH control 33 at the discharge side of the cooler 34 act on the valve 32, preferably between the operating intervals of the $SO_2$ analyzer. An $SO_2$ recorder 35 is also employed.

The necessity for clean cooking liquor, in view of the possibility of some solids being present in the washer filtrate and the collection of solids in the form of unburned carbon from the gases in the absorption tower, is provided for by filtering the liquor in a suitable filter 40. By having the filter subsequent to the pH control operation, the calcium compounds in suspension in the liquor can be removed along with any carbon or other solid particles. The magnesium bisulphite liquor is fortified to the desired sulphidity by bringing sulphur dioxide, generated by the sulphur burners 41 and cooled in the gas cooler 42, into contact with the liquor while passing through a gas absorption system 43. The fortified liquor is then delivered to a tank 44 where it is mixed with relief gases from the digester 10 before being delivered to the cooking acid storage tank.

The cyclic recovery system described is disclosed and claimed in a copending application of George H. Tomlinson, Serial No. 387,474, filed April 8, 1941.

The high cost of chemicals involved in a pulping process employing a relatively pure magnesium base cooking liquor requires a cyclic recovery process having a high efficiency of recovery of the heat and chemical values of the residual liquor to be economic. The chemicals must also be recovered in a form which permits their economic reuse in the pulping process and the heat values in the liquor must be recovered in economic quantities. This requires that the magnesium compounds recovered have a high percentage of magnesium (MgO) of a high reactivity and free from carbon, and that the sulphur content be recovered in the form of sulphur dioxide. An overheated or "dead burned" magnesium oxide is definitely undesirable as being only slowly reactive in the production of cooking acid. Complete combustion in the furnace is necessary both in the interests of thermal efficiency and obtaining an ash as free from impurities as possible in order to minimize the subsequent filtering operation.

It has been found however, that recovery furnace conditions suitable for obtaining certain of these characteristics are not suitable for obtaining others. For example, it is important that any magnesium compounds in the form of magnesium sulphate be reduced to magnesium oxide while in the furnace as the sulphate is of no value in the cooking liquor and would form a dead load of chemical circulating through the system. The greatest reduction of the sulphate will occur when a high temperature reducing atmosphere is maintained in the furnace. However, high temperature conditions are not suitable for obtaining the highly reactive caustic burned magnesia desired, nor is a highly reducing atmosphere suitable for complete combustion of the combustible portions of the liquor. Complete combustion of the combustible matter is favored by the use of a substantial amount of excess air in the furnace, but such conditions tend to increase the percentage of sulphur dioxide ($SO_2$) converted into sulphur trioxide ($SO_3$), this reaction being accelerated in the temperature range (1000°–1200° F.). While any sulphur trioxide in the heating gases can be recovered in the absorption towers, it would combine with the magnesia in the slurry to form magnesium sulphate and add to the dead load of circulating chemicals. The production of caustic magnesia of the desired reactivity, i. e. a mean reactivity not less than 1.5 on an arbitrary scale which has been devised, on which ordinary commercial caustic magnesia has a mean reactivity of 2.1, requires careful control of the temperature and atmosphere conditions, velocity of gas flow in the furnace, and size of the ash particles. It has been found that furnace temperatures in the range of 1800°–2400° F., and preferably 2100°–2300° F., are most desirable with a rapid passage of the ash particles through the furnace sections having such temperatures, the permissible time of exposure decreasing as the temperature increases. When exposed to temperatures above 1800° F., for more than a short time, the reactivity of magnesia diminishes and at approximately 2700° F., the product is completely "dead burned." All of these factors require consideration in the design and operation of the recovery apparatus.

As shown in Figs. 2–8 the main heat and chemical recovery apparatus consists of a combined furnace and steam boiler unit 24 having a furnace chamber 50 of rectangular horizontal and vertical cross-section formed by refractory walls consisting of a vertical front wall 51, side walls 52, roof 53, floor 54, and bridge wall 55. The bridge wall combines with the roof and side walls to form a rectangularly shaped gas passage 56 connecting the furnace chamber 50 with a vertically elongated narrow passage 57 of rectangular horizontal and vertical cross-section at the rear side of the bridge wall 55, constituting an unobstructed open pass between the furnace chamber and the convection heat absorbing section of the unit.

At the rear side of the passage 57 is arranged a bank of vertically disposed steam generating tubes 60 having their upper and lower ends respectively connected to a horizontal steam and water drum 61 and a lower water drum 62 arranged transversely of the unit. The front row of tubes 60ª are offset laterally and provided with integral metallic studs over the greater portion of their length with the intertube spaces filled with refractory to form a water cooled baffle 63 extending downwardly from a point adjacent the drum 61 and defining the rear wall of the passage 57. The baffle 63 terminates above the bottom of the passage 57 and the remaining unstudded portions of alternate tubes 60ª are bent in spaced relation to form a water tube screen 64 across the gas discharge opening at the lower rear side of the passage 57.

A horizontally extending refractory baffle 65 extends across the lower portion of the tube bank from the bottom of the passage 57 to the rear side of the drum 62 to form the bottom of the gas passes within the tube bank and to protect the drum 62 from contact with the heating gases. The rear portion of the baffle 65 slopes downwardly to form one side of a hopper 65ᵃ having a bottom outlet for ash deposited therein.

A refractory baffle 66 extends upwardly from the baffle 65 between two rows of tubes 60 and terminates short of a horizontal refractory extension 63ᵃ of the tube baffle 63 protecting the drum 61. One of the baffle supporting tube rows has the portion of alternate tubes above the upper end of the baffle 66 bent laterally to increase the gas flow area therethrough. Another vertical refractory baffle 67 extends downwardly from the baffle extension 63ᵃ adjacent the rear side of the tube bank to a point short of the horizontal baffle 65 to form a vertical gas pass 68 between the baffles 66 and 67 with a gas exit 69 at its lower end. Most of the steam generating tubes 60 are positioned within the gas pass 68. The two rearmost rows of tubes 60ᶜ are positioned between the baffle 67 and the adjacent wall of the associated air heater to protect these tube rows from any heating gas flow thereover and insure a downflow of water therethrough. The portions of alternate tubes in the rearmost row arranged across the gas exit 69 are bent out of alignment. Access doors 50ᵃ, 57ᵃ and 65ᵇ are provided at the bottom of the various gas passages where ash may tend to collect.

The baffles 63 and 66 define a vertical gas flow passage 70 of substantially the same width as the gas passages 57 and 68. As shown in Fig. 6, the space 70 is divided into three sections transversely of the unit by transversely spaced groups of vertical steam generating tubes 60ᵇ arranged in alignment between the baffles 63 and 66. The tubes of each group have their lower ends bent and connected to the water drum 62 in a single row and their upper ends connected to a corresponding short horizontal header 71, each of which is connected to the drum 61 by tubes 72.

With the foregoing construction the heating gases leaving the lower end of the passage 57 will pass through the tube screen 64 into the lower end of the sections of the passage 70, all of the walls of which are thus defined by water tubes. The gas temperature therein is reduced by radiation to and contact with the surrounding water tubes. The condition of the heating gases in the passage 70 permits the installation of superheating surface in the upper portions of the sections thereof, and, as shown in Figs. 2, 4 and 5, the superheating surface consists of small diameter multi-looped tubes 73 arranged in parallel vertical flat coils with the upper ends of the end tube legs extending between the horizontal upper portions of the baffle tubes 60ᵃ and connected to superheater inlet and outlet headers 75 and 76 respectively. Tubes 77 connect the inlet header 75 to the steam space of the drum 61.

The concentrated liquor from the liquor storage tank 23 is delivered by a pump 80 through a pipe line 81 having a return flow connection 82 to the tank, to the furnace. Separately controllable liquor nozzles 83 positioned in corresponding burner ports 84 in the furnace roof 53 are employed for introducing the liquor. An atomizing steam nozzle 85 alongside each liquor nozzle 83 is supplied with steam from the turbine 22, as indicated in Fig. 1. Each pair of liquor and steam nozzles has an associated adjustable distributor block 86 carried by a bracket 87 supported on the nozzle assembly, as shown in Figs. 7 and 8. Each block has a vertically arranged impact surface 88, against which the steam jet impacts and is deflected across the converging liquor stream, breaking up the liquor stream into a relatively flat finely divided spray distributed substantially in a plane parallel and adjacent to the front wall of the furnace.

Combustion air is separately supplied to each burner port from a preheated air duct 90 by branch ducts 91 controlled by dampers 92. The duct 90 forms a branch of a main air duct 93 connected to the outlet of a tubular air heater 94 at the rear of the boiler bank. A forced draft fan 105 maintains a pressure air supply to the air heater and furnace, the fans 27 and 105 being manually or automatically regulated to maintain the desired furnace pressure and gas velocity throughout the unit.

In operation the furnace chamber 50 is initially heated to a predetermined temperature by auxiliary fuel, such as a wood fire on the furnace bottom 54 or auxiliary oil or gas burners temporarily inserted into the furnace. With the burner arrangement described the residual liquor introduced will burn in suspension while in a vertically elongated U-shaped path extending downwardly along the front wall 51, across the furnace floor, and upwardly along the bridge wall 55 to the gas exit 56. The fuel stream and products of combustion then pass downwardly through the first open pass 57, and through the tube screen 64 into the various sections of the passage 70. The gas stream passes upwardly through the sections of the passage 70 in contact with the water tubes forming the walls thereof in an unobstructed flow until reaching the superheater tubes 73. The gases then flow along the superheater tubes over the upper end of the baffle 66 and downwardly through the main generating section of the boiler longitudinally of the tubes 60. The gases pass across the lower ends of the downcomer tubes 60 and out the gas exit 69.

To permit the efficient recovery of magnesium and sulphur in a form permitting their economic reuse in the cyclic system, maintenance of predetermined temperatures, atmospheres and gas velocities in different portions of the unit is of prime importance. A long flame combustion of the liquor under a reducing atmosphere to a location adjacent the bottom of the first open pass is desirable to avoid excessive furnace temperatures and dead-burning of the magnesia. For this purpose the total amount of combustion air supplied to the furnace is only slightly in excess of the theoretical combustion requirements and that air is supplied to the furnace at widely spaced points along the flow path in predetermined proportion. A total combustion air approximately 110% of the theoretical requirements has been found suitable, for example. About 80% of the theoretical amount is introduced through the conduits 91 and burner ports 84 along with the sprayed liquor to be incinerated. The reverbatory effect of the U-shaped flame path in the furnace facilitates the drying, distillation, ignition and combustion of the entering liquor.

The liquor particles are burned in suspension as they pass downwardly along the front wall 51 and a considerable portion of the chemical ash tends to separate from the burning fuel stream as the flame and gas stream turns across the floor 54 and upwardly toward the gas exit 56. The separated chemical tends to deposit on the floor 54 and if permitted to so deposit and remain thereon would rapidly become dead-burned and substantially useless in the pulping process. A second supply of combustion air is delivered to the furnace from a main branch duct 90ᵃ through horizontally arranged inlet passages 95 formed along the front wall 51 at the level of the furnace floor 54 and opening into a branch air duct 96 controlled by a damper 97. Normally, about 15% of the theoretical air supply is discharged by the inlets 95 horizontally across the furnace floor 54 to supply additional air for combustion and also to cause any ash tending to deposit on the furnace floor to be swept out of the furnace with the furnace gases. With the described amounts of combustion air supplied, a reducing atmosphere is maintained throughout the furnace chamber 50 and open pass 57, and after probably a breakdown of the magnesium lignin sulphonate to magnesium sulphate, the magnesium sulphate is reduced to magnesium oxide with the release of sulphur dioxide and carbon dioxide approximately in accordance with the formula:

$$2MgSO_4 + C = 2MgO + 2SO_2 + CO_2$$

The thick refractory walls of the furnace chamber with their substantial heat storage capacity contribute to the maintenance of uniform temperature conditions therein. The heating gases and suspended ash particles passing out through the gas exit 56 down through the passage 57 contain some unburned carbon particles and combustible gases, the combustion of which is completed in the lower part of the passage 57 and passage 70 by the introduction of a third air supply through a series of air inlet openings 98 opening through the rear side of the bridge wall 55. The air inlets 98 are connected to an air duct 99, having a control damper 100, through vertical passages 101 in the bridge wall and horizontal passages 102 below the furnace floor. About 15% of the theoretical air supply is delivered to the ports 98 and an oxidizing atmosphere thus maintained in the lower part of the passages 57 and 70. Combustion is completed and the temperature of the heating gases and suspended ash particles is reduced as the stream enters the passage 70 by radiation to the water cooled walls of that space and the subdividing tube groups 60$^b$. The lowering of the temperature of the gases affords a safe metal temperature for the superheater tubes 73.

The furnace is thus designed with respect to shape and air admission to maintain a reducing atmosphere of gases in that portion of their travel to a location in the first open pass 57, where additional air is admitted to complete combustion just prior to the gas entrance to the second open pass 70. In contrast to the mainly refractory construction of the first pass walls, the walls of the second pass are mainly water cooled. The time-temperature relation necessary to obtain the resulting magnesium oxide ash in a highly reactive condition best suited for the subsequent production of magnesium bisulphite cooking acid is thus obtained. While the addition of air and the production of an oxidizing atmosphere in the lower part of the first open pass insures completion of combustion, the reaction of the sulphur dioxide released to sulphur trioxide is minimized, even with the oxidizing atmosphere present, by passing the gases quickly through the temperature range (1000°–1200° F.) in which this reaction is accelerated by having the gases on completion of combustion enter the main tube bank pass 68 wherein the gas temperature is rapidly reduced through this range.

The chemical recovery unit described when used to treat the residual liquor from a pulp mill having a pulp capacity of 100 tons per day and with liquor of the analysis given, will receive approximately 19,300 lbs./hr. With the furnace construction, and distribution and gas velocity described herein, the gas temperature on leaving the furnace chamber 50 will be approximately 2250° F. and entering the screen 64 approximately 2140° F.

The boiler heating surface is characterized by its simplicity of construction and ease in which it can be kept absolutely clean of ash. The furnace temperatures maintained are below the fusion temperature of the ash, and the tubes and baffles of the boiler are so arranged that any of the dry ash depositing thereon can be readily removed. All of the boiler tubes are vertical as well as the baffles defining the boiler passes. Both of the horizontal baffles 63$^a$ and 65 are readily cleanable and insure freedom of corrosion of the drum tube connections from the high sulphur bearing gases—this being particularly true under conditions when the unit is off the line and the gas temperature is below the dew point, when any accumulation of ash saturated with sulphur gases would cause corrosion. The ability to maintain the boiler heating surface absolutely clean minimizes the draft loss and permits the use of high gas velocities, such as 50 feet per second, for example, consistent with the economical utilization of induced draft fan power requirements and consequently results in highly efficient heat transfer conditions. The rapid travel of the gases and suspended chemicals at such velocities is indicated by the fact that the length of the flow path from the spray nozzles to the bottom of the first open pass may be approximately 50 feet, for example.

On leaving the boiler, the heating gases pass upwardly, through the tubes of the air heater 94 with the air to be preheated flowing downwardly around the tubes in three passes, as indicated in Fig. 2, under the action of the forced draft fan 105. The gases then flow in parallel through the dust collecting cyclones forming the separating apparatus 25. Most of the chemical ash in suspension is separated at this point and collected in hoppers 113 at the bottom of the cyclones. The gases then pass out through the induced draft fan 27 to the spray tower 18. The spray tower 18 is divided into a pair of narrow and wide passes 115 and 116 respectively. The gases flow downwardly through the passage 115 in which they successively contact descending sprays of residual liquor delivered from the tank 17 to vertically spaced spray nozzles 117. The gases then flow upwardly through the pass 116 to the absorption towers 28 and 29. An inclined baffle 118 is arranged along the rear side of the spray tower above the liquor outlet 119 through which a pump receives the liquor and discharges it to the neutralizing tank 19.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Apparatus for the recovery of chemicals in a dry condition and heat from waste liquor containing inorganic chemicals and combustible organic matter comprising in combination walls defining a vertical furnace chamber having a normally closed floor and a gas outlet in the upper part thereof, downwardly directed means for introducing and spraying the waste liquor into said furnace chamber, said furnace chamber and said spraying means being constructed and arranged for burning the waste liquor in suspension therein while passing through a U-shaped flame path to said gas outlet to yield a dry chemical ash, whereby the combustion gases contain in suspension substantially all of the chemical ash produced in said furnace chamber, an unobstructed vertical gas passage receiving combustion gases from said gas outlet, means for controlling the atmosphere in said furnace chamber including an air inlet adjacent said spraying means and an air inlet adjacent said furnace chamber floor, means for supplying additional combustion air to the lower part of said gas passage, a steam boiler having water tube cooled walls defining a vertical pass connected to and receiving ash-laden combustion gases from the lower end of said gas passage, a superheater in the upper part of said pass, means forming a second serially connected vertical pass having a bank of vertical steam generating tubes therein, the effective gas flow areas of said vertical gas passage and said first and second vertical passes being constructed and relatively proportioned to provide a gas velocity therein sufficient to maintain said chemical ash in suspension, and upper and lower drums connected to said tube bank.

2. Apparatus for the recovery of chemicals in a dry condition and heat from waste liquor containing inorganic chemicals and combustible organic matter comprising in combination walls defining a furnace chamber having a normally closed bottom and a gas outlet in the upper part thereof, means constructed and arranged for introducing and burning the combustible organic matter in the waste liquor in suspension in said furnace chamber to yield a dry chemical ash, whereby the combustion gases contain in suspension substantially all of the chemical ash produced in said furnace chamber, an unobstructed vertical gas passage receiving said combustion gases from said gas outlet, a steam boiler having a transversely elongated vertical pass receiving said ash-laden combustion gases from said gas passage, transversely spaced groups of vertical water tubes arranged to divide said pass into side-by-side sections, means forming a second serially connected vertical pass having a bank of vertical steam generating tubes therein and a gas outlet at the lower end thereof, and a pair of horizontally arranged transversely extending upper and lower drums connected to said tube bank, the effective flow areas of said vertical gas passage and said first and second vertical passes being constructed and relatively proportioned to provide a gas velocity therein sufficient to maintain said chemical ash in suspension.

3. Apparatus for the recovery of chemicals in a dry condition and heat from waste liquor containing inorganic chemicals and combustible organic matter comprising in combination walls defining a furnace chamber having a normally closed bottom and a gas outlet in the upper part thereof, means constructed and arranged for introducing and burning the combustible organic matter in the waste liquor in suspension in said furnace chamber to yield a dry chemical ash, whereby the combustion gases contain in suspension substantially all of the chemical ash produced in said furnace chamber, an unobstructed vertical gas passage receiving said combustion gases at its upper end from said gas outlet, a steam boiler having water tube cooled walls defining a vertical pass connected to and receiving said ash-laden combustion gases from the bottom of said gas passage, means forming a second serially connected vertical pass having a bank of vertical steam generating tubes therein and a gas outlet at the lower end thereof, the effective gas flow areas of said vertical gas passage and said first and second vertical passes being constructed and relatively proportioned to provide a gas velocity therein sufficient to maintain said chemical ash in suspension, a pair of transversely extending upper and lower drums connected to said tube bank, and downcomer tubes connecting said drums arranged beyond the rear side of said second pass.

4. Apparatus for the recovery of chemicals in a dry condition and heat from waste liquor containing inorganic chemicals and combustible organic matter comprising in combination walls defining a furnace chamber having a normally closed bottom and a gas outlet in the upper part thereof, means constructed and arranged for introducing and burning the combustible organic matter in the waste liquor in suspension in said furnace chamber to yield a dry chemical ash, whereby the combustion gases contain in suspension substantially all of the chemical ash produced in said furnace chamber, an unobstructed vertical gas passage receiving said combustion gases at its upper end from said gas outlet, a steam boiler having water tube cooled walls defining a vertical pass receiving said ash-laden combustion gases from said gas passage, means forming a second serially connected vertical pass having a bank of vertical steam generating tubes therein and a gas outlet at the lower end thereof, the effective gas flow areas of said vertical gas passage and said first and second vertical passes being constructed and relatively proportioned to provide a gas velocity therein sufficient to maintain said chemical ash in suspension, a pair of transversely extending upper and lower drums connected to said tube bank, downcomer tubes connecting said drums, a horizontally arranged baffle forming the top of said passes and protecting said upper drum from contact with said combustion gases, and a horizontally arranged baffle extending from the bottom of said unobstructed passage and protecting said lower drum from contact with said combustion gases.

5. Apparatus for the recovery of chemicals in a dry condition and heat from waste liquor containing inorganic chemicals and combustible organic matter comprising in combination walls defining a furnace chamber having a normally closed bottom and a gas outlet in the upper part thereof, means constructed and arranged for introducing and burning the combustible organic matter in the waste liquor in suspension in said furnace chamber to yield a dry chemical ash, whereby the combustion gases contain in suspension substantially all of the chemical ash produced in said furnace chamber, an unobstructed vertical gas passage receiving said combustion gases at its upper end from said gas outlet, a steam boiler having water tube cooled walls defining a vertical pass receiving said ash-laden combustion gases from said gas passage, a tube screen at the entrance to said pass, a superheater in the upper part of said pass having multiple-looped tubes arranged in parallel flat vertical coils, baffles forming a second serially connected vertical pass having a bank of vertical steam generating tubes therein and a gas outlet at the lower end thereof, the effective gas flow areas of said vertical gas passage and said first and second vertical passes being constructed and relatively proportioned to provide a gas velocity therein sufficient to maintain said chemical ash in suspension, a pair of horizontally arranged transversely extending upper and lower drums connected to said tube bank, downcomer tubes connecting said drums and arranged beyond the rear side of said second pass, a horizontally arranged baffle forming the top of said passes and protecting said upper drum from contact with said combustion gases, and a horizontally arranged refractory baffle forming the bottom of said passes and protecting said lower drum from contact with said combustion gases.

6. Apparatus for the recovery of chemicals in a dry condition and heat from waste liquor containing inorganic chemicals and combustible organic matter comprising in combination walls defining a furnace chamber having a normally closed bottom and a gas outlet in the upper part thereof, means constructed and arranged for introducing and burning the combustible organic matter in said waste liquor in said furnace chamber to yield a dry chemical ash, whereby the combustion gases contain in suspension substantially all of the chemical ash produced in said furnace chamber, an unobstructed vertical gas passage receiving said ash-laden combustion gases at its upper end from said gas outlet, a steam boiler having water tube cooled walls defining a vertical pass connected to and receiving said ash-laden combustion gases from the bottom of said gas passage, a superheater in the upper part of said pass, means forming a second serially connected vertical pass having a bank of vertical steam generating tubes therein and a combustion gas outlet at the lower end thereof, the effective gas flow areas of said vertical gas passage and said first and second vertical passes being constructed and relatively proportioned to provide a gas velocity therein sufficient to maintain said chemical ash in suspension, a pair of horizontally arranged transversely extending upper and lower drums connected to said tube bank, and downcomer tubes directly connecting said drums arranged beyond the rear side of said second pass and out of the combustion gas flow path for substantially their entire length.

7. Apparatus for the recovery of chemicals in a dry condition and heat from waste liquor containing inorganic chemicals and combustible organic matter comprising in combination walls defining a furnace chamber having a normally closed bottom and a gas outlet in the upper part thereof, means constructed and arranged for introducing and burning the combustible organic matter in the waste liquor in suspension in said furnace chamber to yield a dry chemical ash, whereby the combustion gases contain in suspension substantially all of the chemical ash produced in said furnace chamber, an unobstructed vertical gas passage receiving said ash-laden combustion gases from said gas outlet, a steam boiler having a transversely elongated vertical pass receiving said ash-laden combustion gases from said gas passage, transversely spaced groups of vertical water tubes arranged to divide said pass into side-by-side sections, a tube screen at the entrance to said pass, a superheater in the upper part of said pass having multiple-looped tubes arranged in parallel flat vertical coils, baffles forming a second serially connected vertical pass having a bank of vertical steam generating tubes therein and a gas outlet at the lower end thereof, the effective gas flow areas of said vertical gas passage and said first and second vertical passes being constructed and relatively proportioned to provide a gas velocity therein sufficient to maintain said chemical ash in suspension, a pair of horizontally arranged transversely extending upper and lower drums connected to said tube bank, downcomer tubes connecting said drums arranged beyond the rear side of said second pass and out of the combustion gas flow path for substantially their entire length, a horizontally arranged baffle forming the top of said passes and protecting said upper drum from contact with said combustion gases, and a horizontally arranged refractory baffle extending from the bottom of said unobstructed passage and protecting said lower drum from contact with said combustion gases.

8. Apparatus for the recovery of chemicals in a dry condition and heat from waste liquor containing inorganic chemicals and combustible organic matter comprising in combination walls arranged to form a setting enclosing a furnace section and a laterally adjoining boiler section, a vertical bridge wall in said furnace section arranged between and dividing said furnace section into a furnace chamber having a normally closed bottom and a gas outlet in the upper part thereof and an unobstructed vertical gas passage having its upper end connected to said gas outlet, nozzle means constructed and arranged to introduce the waste liquor in suspension in said furnace chamber, means for supplying combustion air to said furnace chamber to burn the combustible organic matter in said waste liquor and yield a dry chemical ash in suspension in the combustion gases produced, whereby the combustion gases contain in suspension substantially all of the chemical ash produced in said furnace chamber, said vertical gas passage being arranged to receive said ash-laden combustion gases from said gas outlet, means for supplying additional combustion air through said bridge wall at a point intermediate the height of said vertical passage, said boiler section comprising a vertical upflow gas pass having its lower end opening to said vertical passage and receiving said ash-laden combustion gases therefrom, means arranged to form a vertical downflow gas pass opening at its upper end to the upper end of said upflow pass, a bank of vertical steam generating tubes in said downflow pass, the effective gas flow areas of said vertical gas passage and said first and second vertical passes being constructed and relatively proportioned to provide a gas velocity therein sufficient to maintain said chemical ash in suspension, and upper and lower drums directly connected to said bank of steam generating tubes.

9. Apparatus for the recovery of chemicals in a dry condition and heat from waste liquor containing inorganic chemicals and combustible organic matter comprising in combination walls arranged to form a setting enclosing a furnace section and a laterally adjoining boiler section, a vertical bridge wall in said furnace section arranged between and dividing said furnace section into a furnace chamber having a normally closed bottom and a heating gas outlet in the upper part thereof and an unobstructed vertical gas passage, said gas passage being of substantially smaller gas flow area than said furnace chamber and having its upper end connected to said gas outlet, nozzle means constructed and arranged to introduce the waste liquor in suspension into said furnace chamber, means for supplying combustion air to said furnace chamber to burn the combustible organic matter in said waste liquor in suspension and yield a dry chemical ash, whereby the combustion gases contain in suspension substantially all of the chemical ash produced in said furnace chamber in suspension in the combustion gases produced, said vertical gas passage being arranged to receive said combustion gases from said gas outlet, means for supplying additional combustion air to said vertical passage, said boiler section comprising a vertical upflow gas pass having its lower end opening to the lower end of said vertical passage, steam superheater tubes arranged in the upper part of said upflow pass, means arranged to form a vertical downflow gas pass opening at its upper end to the upper end of said upflow pass, a bank of vertical steam generating tubes closely spaced in said downflow pass, the effective gas flow areas of said vertical gas passage and said first and second vertical passes being constructed and relatively proportioned to provide a gas velocity therein sufficient to maintain said chemical ash in suspension, upper and lower drums directly connected to said steam generating tubes, and additional steam generating tubes connected to said drums and having staggered portions relatively arranged to form a tube screen across the gas entrance to said upflow gas pass so as to minimize obstruction to the flow of combustion gases.

10. Apparatus for the recovery of chemicals in a dry condition and heat from waste liquor containing inorganic chemicals and combustible organic matter comprising in combination walls arranged to form a setting enclosing a furnace section and a laterally adjoining boiler section, a vertical bridge wall in said furnace section arranged between and dividing said furnace section into a furnace chamber having a normally closed bottom and a heating gas outlet in the upper part thereof and an unobstructed vertical gas passage, said gas passage being of substantially smaller gas flow area than said furnace chamber and having its upper end connected to said gas outlet, nozzle means constructed and arranged to introduce the waste liquor in suspension into said furnace chamber, means for supplying combustion air to said furnace chamber to burn the combustible organic matter in said waste liquor in suspension and yield a dry chemical ash in suspension in the combustion gases produced, whereby the combustion gases contain in suspension substantially all of the chemical ash produced in said furnace chamber, said vertical gas passage being arranged to receive said ash-laden combustion gases from said gas outlet, said boiler section comprising a transversely elongated vertical upflow gas pass having its lower end opening to the lower end of said vertical passage, transversely spaced groups of vertical water tubes arranged to divide said gas pass into sections, steam superheater tubes arranged in multiple-looped parallel flat vertical coils positioned between said water tube groups in the upper part of said sections, means arranged to form a vertical downflow gas pass opening at its upper end to the upper end of said upflow pass, a bank of vertical steam generating tubes closely spaced in said downflow pass, the effective gas flow areas of said vertical gas passage and said first and second vertical passes being constructed and relatively proportioned to provide a gas velocity therein sufficient to maintain said chemical ash in suspension, upper and lower drums directly connected to said steam generating tubes, and additional steam generating tubes connected to said drums and having portions relatively arranged to provide increased gas flow area for the gas entrance to said upflow gas pass.

11. Apparatus for the recovery of chemicals in a dry condition and heat from waste liquor containing inorganic chemicals and combustible organic matter comprising in combination walls arranged to form a setting enclosing a furnace section and a laterally adjoining boiler section, a vertical bridge wall in said furnace section arranged between and dividing said furnace section into a furnace chamber having a normally closed bottom and a heating gas outlet in the upper part thereof and an unobstructed vertical gas passage, said gas passage being of substantially smaller gas flow area than said furnace chamber and having its upper end connected to said gas outlet, nozzle means constructed and arranged to introduce the waste liquor in suspension in said furnace chamber, means for supplying combustion air to said furnace chamber to burn the combustible organic matter in said waste liquor in suspension and yield a dry chemical ash in suspension in the combustion gases produced, whereby the combustion gases contain in suspension substantially all of the chemical ash produced in said furnace chamber, said vertical gas passage being arranged to receive said ash-laden combustion gases from said gas outlet, means for supplying additional combustion air through said bridge wall to the lower part of said vertical passage, said boiler section comprising a transversely elongated vertical upflow gas pass having its lower end opening to said vertical passage, transversely spaced groups of vertical water tubes arranged to divide said gas pass into sections, steam superheater tubes arranged in multiple-looped parallel flat vertical coils positioned between said water tube groups in the upper part of said sections, means arranged to form a vertical downflow gas pass opening at its upper end to the upper end of said upflow pass, a bank of vertical steam generating tubes closely spaced in said downflow pass, the effective gas flow areas of said vertical gas passage and said first and second vertical passes being constructed and relatively proportioned to provide a gas velocity therein sufficient to maintain said chemical ash in suspension, and upper and lower drums directly connected to said steam generating tubes.

12. Apparatus for the recovery of chemicals in a dry condition and heat from waste liquor containing inorganic chemicals and combustible organic matter comprising in combination walls arranged to form a setting enclosing a furnace section and a laterally adjoining boiler section, a vertical bridge wall in said furnace section arranged between and dividing said furnace section into a furnace chamber having a normally closed bottom and a heating gas outlet in the upper part thereof, and an unobstructed vertical gas passage having its upper end connected to said gas outlet, nozzle means constructed and arranged to introduce the waste liquor in suspension in said furnace chamber, means for supplying combustion air to said furnace chamber to burn the combustible organic matter in said waste liquor in suspension and yield a dry chemical ash in suspension in the combustion gases produced, whereby the combustion gases contain in suspension substantially all of the chemical ash produced in said furnace chamber, said vertical gas passage being arranged to receive said ash-laden combustion gases from said gas outlet, means for supplying additional combustion air to the lower part of said vertical passage, said boiler section comprising a transversely elongated vertical upflow gas pass having its lower end opening to the lower end of said vertical passage, transversely spaced groups of vertical water tubes arranged to divide said gas pass into side-by-side sections, steam superheater tubes arranged in multiple-looped parallel flat vertical coils positioned between said water tube groups in the upper part of said sections, means arranged to form a vertical downflow gas pass opening at its upper end to the upper end of said upflow pass, a bank of vertical steam generating tubes closely spaced in said downflow pass, the effective gas flow areas of said vertical gas passage and said first and second vertical passes being constructed and relatively proportioned to provide a gas velocity therein sufficient to maintain said chemical ash in suspension, upper and lower drums directly connected to said steam generating tubes, and additional steam generating tubes connected to said drums and having portions relatively arranged to provide increased gas flow area for the gas entrance to said upflow and downflow gas passes.

LESLIE S. WILCOXSON.

CERTIFICATE OF CORRECTION.

Patent No. 2,354,175.                                                     July 18, 1944.

LESLIE S. WILCOXSON.

It is hereby certified that error appears in the printed specification of the above numbered patent requiring correction as follows: Page 2, first column, line 63, before "a storage" insert --The concentrated liquor is then delivered to--; page 4, second column, line 36, for "tubes 60" read --tubes 60$^c$--; and that the said Letters Patent should be read with this correction therein that the same may conform to the record of the case in the Patent Office.

Signed and sealed this 24th day of April, A. D. 1945.

Leslie Frazer (Seal)                                                  Acting Commissioner of Patents.